(12) United States Patent
Alidi et al.

(10) Patent No.: US 11,944,920 B2
(45) Date of Patent: Apr. 2, 2024

(54) MODIFIED GATHERING MANIFOLD, A PRODUCTION SYSTEM, AND A METHOD OF USE

(71) Applicant: SAUDI ARABIAN OIL COMPANY, Dhahran (SA)

(72) Inventors: Rayan A Alidi, Al-Khobar (SA); Abdulrahman H Almutairi, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 256 days.

(21) Appl. No.: 17/362,271

(22) Filed: Jun. 29, 2021

(65) Prior Publication Data
US 2022/0412213 A1   Dec. 29, 2022

(51) Int. Cl.
| B01D 17/12 | (2006.01) |
| B01D 17/02 | (2006.01) |
| B01D 19/00 | (2006.01) |
| E21B 43/34 | (2006.01) |
| E21B 49/08 | (2006.01) |

(52) U.S. Cl.
CPC .......... *B01D 17/12* (2013.01); *B01D 17/02* (2013.01); *B01D 19/0063* (2013.01); *E21B 43/34* (2013.01); *E21B 49/086* (2013.01)

(58) Field of Classification Search
CPC ........ B01D 17/12; E21B 43/34; E21B 49/086
See application file for complete search history.

(56) References Cited

U.S. PATENT DOCUMENTS

| 3,045,750 A | * | 7/1962 | Peters | ..................... F16K 31/48 |
| | | | | 166/250.01 |
| 6,454,002 B1 | * | 9/2002 | Stokes | .................. E21B 43/123 |
| | | | | 166/250.15 |
| 6,499,344 B2 | * | 12/2002 | Nelson | .................... E21B 43/34 |
| | | | | 73/152.31 |

(Continued)

FOREIGN PATENT DOCUMENTS

| CN | 201628077 U | 11/2010 |
| WO | 2014078853 A1 | 5/2014 |

OTHER PUBLICATIONS

Smith, "The Application of Multi-phase Metering on Oil & Gas Gathering Platforms," SPE 30662 (Year: 1995).*

(Continued)

*Primary Examiner* — John Fitzgerald
(74) *Attorney, Agent, or Firm* — Osha Bergman Watanabe & Burton LLP (57) ABSTRACT

A modified gathering manifold is disclosed, including a sampling header coupled to each of multiple production lines of wells, and a plurality of diverters, each coupled to one of the production lines, upstream of a relief header coupled to each of the plurality of production lines and a production header associated with the manifold and coupled to each of the plurality of production lines. The sampling header receives a production fluid diverted by a diverter in the open position. The manifold also includes a three-phase separator coupled to the sampling header downstream of the plurality of diverters that separates the production fluid into crude oil, water, and gas, and detects a volume flow rate for each. A return header passes the crude oil, the water, and the gas from the three-phase separator into the production header where they are combined into a hydrocarbon fluid flow.

6 Claims, 4 Drawing Sheets

(56) References Cited

U.S. PATENT DOCUMENTS

| | | | | |
|---|---|---|---|---|
| 6,561,041 B1* | 5/2003 | Eck | ............ | E21B 47/10 |
| | | | | 73/861.04 |
| 7,137,451 B2* | 11/2006 | Smith | ............ | E21B 33/0355 |
| | | | | 166/336 |
| 7,415,357 B1* | 8/2008 | Stluka | ............ | E21B 47/10 |
| | | | | 702/6 |
| 9,650,890 B2* | 5/2017 | Scott | ............ | E21B 49/08 |
| 11,035,840 B2* | 6/2021 | Miglis | ............ | B01D 17/0217 |
| 11,274,550 B2* | 3/2022 | Duncan | ............ | E21B 34/16 |
| 11,320,347 B1* | 5/2022 | Borad | ............ | B01F 25/40 |
| 11,549,350 B2* | 1/2023 | Renick | ............ | E21B 19/16 |
| 2004/0144543 A1* | 7/2004 | Appleford | ............ | E21B 34/04 |
| | | | | 166/336 |
| 2008/0217005 A1* | 9/2008 | Stluka | ............ | E21B 49/08 |
| | | | | 700/51 |
| 2015/0184511 A1* | 7/2015 | Gordon | ............ | E21B 49/088 |
| | | | | 73/152.23 |
| 2015/0226051 A1* | 8/2015 | Machado | ............ | E21B 47/10 |
| | | | | 166/250.03 |

OTHER PUBLICATIONS

Mogbolu et al., "Multi-Rate Testing via Gas Plant with Clamp-On meters: A Niger Delta Case Study", SPE-193486-MS, Society of Petroleum Engineers, Aug. 2018 (10 pages).

Obeahon et al., "Alternative Approach to Multi-Rate Testing", SPE-178272-MS, Society of Petroleum Engineers, Aug. 2015 (14 pages).

Bitaraf, Saminehsadat; "Risk Assessment and Decision Support—Applicable to Oil field Development Plants"; 2011; Chalmers (115 pages).

* cited by examiner

MODIFIED GATHERING MANIFOLD, A PRODUCTION SYSTEM, AND A METHOD OF USE

BACKGROUND

In the petroleum industry, a "deliverability test" is a test to determine the capacity of an oil or gas well at a reservoir pressure and determine the flow rate from the oil and gas well. The deliverability test also is called a productivity test.

A separator may be used to perform the deliverability test. The separator separates the oil, gas, and water in order to obtain accurate rate measurements of each of the different components of the fluid. Conventionally, the separator deliverability test is only performed once every three to four years at a well due to the difficulty of mobilizing, transporting, and installing a separator at the well.

SUMMARY

This summary is provided to introduce concepts that are further described below in the detailed description. This summary is not intended to identify key or essential features of the claimed subject matter, nor is it intended to be used as an aid in limiting the scope of the claimed subject matter.

In general, one or more embodiments disclosed herein relate to a modified gathering manifold having a sampling header coupled to each of a plurality of production lines of a plurality of wells, a plurality of diverters, each coupled to one of the plurality of production lines of the plurality of wells associated with the modified gathering manifold, upstream of a relief header coupled to each of the plurality of production lines and a production header associated with the modified gathering manifold and coupled to each of the plurality of production lines, each diverter being configured to be activated to an open position and deactivated into a closed position, the sampling header being configured to receive a production fluid diverted by a diverter when the diverter is in the open position, a three-phase separator coupled to the sampling header downstream of the plurality of diverters, the three-phase separator being configured to separate the production fluid into crude oil, water, and gas, and detect a volume flow rate for each of the crude oil, the water, and the gas, and a return header coupled to the three-phase separator and the production header, the return header being configured to pass the crude oil, the water, and the gas from the three-phase separator into the production header where the crude oil, the water, and the gas are combined into a hydrocarbon fluid flow.

In general, one or more embodiments disclosed herein relate to a method of using a modified gathering manifold, the method involving introducing a first production flow through a first production line and a second production flow through a second production line into a modified gathering manifold, directing the first production flow into a diverter and the second production flow into a production header, separating the first production flow into a crude oil, a water, and a gas using a three-phase separator, detecting a volume flow rate for each of the crude oil, the water, and the gas, directing, using a return header, the crude oil, the water, and the gas into the production header, combining the crude oil, the water, and the gas into a hydrocarbon fluid flow in a return header, and combining the hydrocarbon fluid flow and the second production flow into a combined fluid flow in the production header.

In general, one or more embodiments disclosed herein relate to a production system including a plurality of wells, each coupled to one of a plurality of production lines including a first production line and a second production line, and a modified gathering manifold coupled to the plurality of production lines and configured to receive a first production flow through the first production line and direct the first fluid using a diverter to a three-phase separator, simultaneously receive a second production flow through a second production line and direct the second production flow into a production header, separate the first fluid into a crude oil, a water, and a gas using the three-phase separator, detect a volume flow rate for each of the crude oil, the water, and the gas in the three-phase separator, and upon detecting the volume flow rate for each of the crude oil, the water, and the gas, direct the crude oil, the water, and the gas into the production header.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, or third) may be used as an adjective for an element (that is, any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Unless explicitly stated otherwise, components and functions are optional and may be combined or subdivided. Similarly, operations may be combined or subdivided, and their sequence may vary.

For large hydrocarbon fields, wells are not directly connected to the processing facilities. Connecting the wells directly requires additional costs for pipelines to be build. Therefore, gathering stations known as "remote headers" or "gathering manifolds" are often employed. These remote headers are connected to a cluster of wells, and the production from these cluster of wells is combined into a large flow line, or "trunk line," that flows to the processing facility. Any additional new well may be connected to the remote header instead of the processing facility, thereby reducing cost. Embodiments provided in the detailed description below describe modified gathering manifolds, their use in determining the fractions (e.g., crude oil, water, or gas) and amount of a production line flow, and the incorporation of the modified gathering manifolds in broader hydrocarbon production systems.

In one or more embodiments, a modified gathering manifold used as part of a production system provides improvements over the conventional techniques of performing the separator deliverability test in order to improve the safety to personnel and equipment and to maximize the overall hydrocarbon production from a plurality of wells while performing a deliverability test on an individual well. The modified gathering manifold has several configuration differences when compared to traditional gathering manifolds. The configuration differences include the incorporation of a permanent three-phase separator, a separator feed header coupled to all of the production lines feeding into the modified gathering manifold through sampling ports positioned upstream of both the relief and production take-offs, and a separator return line coupled to the production header of the modified gathering manifold to permit the separated and measured flows (e.g., crude oil, gas, and water) to be recombined into the production header and passed to the trunk line.

This modified gathering manifold configuration permits the selective performance of a deliverability test on any well that is coupled to the modified gathering manifold at any given time without negatively affecting the production flow from any other well associated with the modified gathering manifold. To perform a test, the production flow being tested is directed to the three-phase separator via the sampling port on the production line. The flows from the other production lines are unchanged and continue to flow into the modified gathering manifold where they are combined and passed to the trunk line. Total fluid production from the modified gathering manifold remains steady even during testing as all the separated products from testing are reincorporated into the production header.

The use of the modified gathering manifold used as part of the production system provides a number of benefits. The system increases the safety to personnel and equipment because the flow of individual wells may be re-directed to the separator that is part of the modified gathering manifold.

Further, the need to mobilize and temporarily install the separator at individual wells is avoided. In addition, the production flow being tested is directed into the production header along with the other wells tied into the modified gathering manifold, which are unaffected by the test, thereby preserving full production rates. Not having to shut in any of the wells—whether a well is being tested or not—maximizes overall hydrocarbon production from the plurality of wells associated with the modified production manifold while performing the deliverability test on the particular well to gather information and assess its individual production performance.

The modified gathering manifold also permits more frequent testing of individual wells to assess important aspects such as reservoir productivity, crude oil composition changes, water encroachment, and amounts of associated gas, each of which may merit additional investigation. For example, by measuring the exact rates either monthly, quarterly, or yearly per individual well, the volume flow rates of the fluid components and pressure decline can be calculated. If the rate and pressure decline is more than 365 MMscf and 200 psi/year respectively, then it is better to ease the production from this well in order to extend the production. Moreover, monitoring the exact water production is important. If there is an increasing trend in water production, then the well will cease production soon. According to another example, continuous sampling of the gas, oil and water facilitates the detection of the corrosion rate of pipelines and processing facilities.

Figure 1:
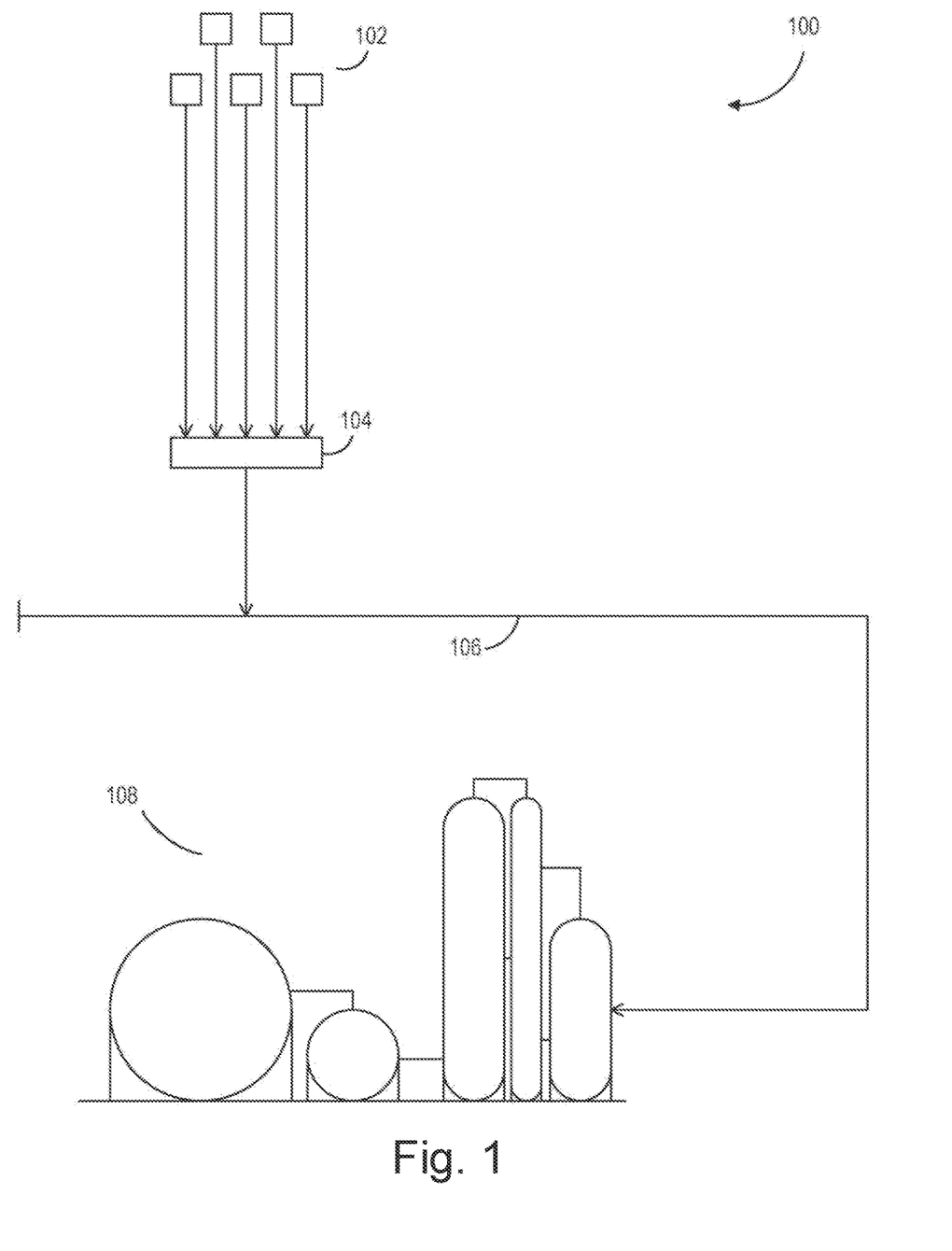
FIG. 1 illustrates a production system, according to one or more example embodiments.

FIG. 1 illustrates a production system according to one or more example embodiments. The production system 100 includes a plurality of wells 102, each producing a fluid from a reservoir that includes crude oil, saline water, and natural gas. Each well 102 couples to a production line that directs the produced fluid from each well 102 into a common fluid collection system, such as a modified gathering manifold 104. At the modified gathering manifold 104, the production flows (hereinafter also "production fluid" or "fluid flows") of several individual wells 102 are combined together into a combined production flow (hereinafter also "combined fluid flow"). The combined production flow is directed through a production header coupled to the modified gathering manifold 104 and into a trunk line 106. The trunk line 106 runs along several modified gathering manifolds 104, collecting and aggregating together several production flows. The trunk line 106 provides the combined production flow to a processing facility 108 for initial field handling, such as the separation of the saline water and natural gas from the unrefined crude oil in preparation for long-distance pipeline or truck transport of these well fluid components.

Figure 2:
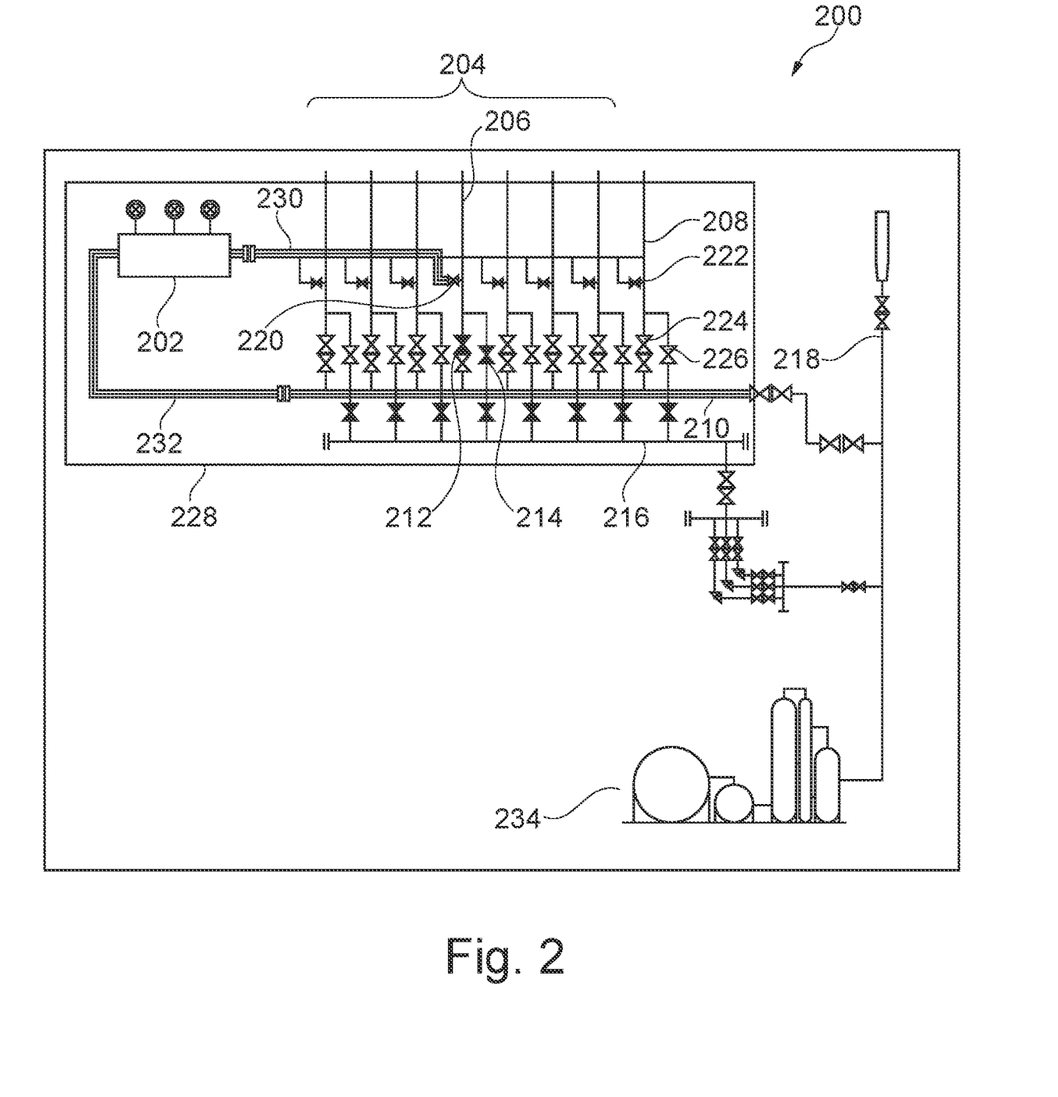
FIG. 2 is a schematic of the production system including a modified gathering manifold for measuring production fluid components, according to one or more example embodiments.

Those skilled in the art will appreciate that while FIG. 1 shows one modified gathering manifold, there may be multiple such gathering manifolds connected to the truck line 106, where each modified gathering manifolds includes FIG. 2 is a schematic of the production system including a modified gathering manifold for measuring production fluid components, according to one or more example embodiments. As shown in FIG. 2, the production system 200 (hereinafter also "system 200") includes a plurality of wells, each coupled to one of a plurality of production lines 204 including a first production line 206 and a second production line 208. For example, the first production line 206 is coupled to a first well and the second production line 208 is coupled to a second well. The system 200 also includes a modified gathering manifold 228 coupled to the plurality of production lines 204.

In some example embodiments, the modified gathering manifold 228 includes a sampling header 230 coupled to each of one or more production lines associated with one or more wells. The one or more wells are associated with the modified gathering manifold 228. The sampling header 230 is a pipeline that is directly connected to a 3-phase separator 202 that is part of the modified gathering manifold 228. For example, as shown in FIG. 2, the sampling header 230 is coupled to each of one or more production lines 204 using a diverter for each well, upstream of a relief header 216 coupled to each production line using a relief valve, and a production header 210 associated with the modified gathering manifold 228 and coupled to each production line using a production valve. In some instances, the diverter may be a sampling header port, a sampling coupling, or a check valve. As shown in FIG. 2, the sampling header 230 is coupled to the first production line 206 using a first diverter 220 and to the second production line 208 using a second diverter 222. The sampling header 230 is configured to receive production fluid from the diverter when the diverter is activated (e.g., when a check valve is open). As shown in FIG. 2, the first diverter 220 is activated and the production fluid flowing through the first production line 206 is directed to the sampling header 230. Simultaneously with activating the first diverter 220, a production valve 212 associated with the first production line 206 and a relief valve 214 associated with the first production line 206 are closed to prevent the production fluid flowing through the first production line 206 from entering directly into a production header 210 coupled to the first production line 206 or a relief header 216 coupled to the relief valve 214. The relief valve may also be known as a pressure relief valve (PRV), which is a type of safety valve used to control or limit the pressure in a system. Without relief valve 214, pressure may otherwise build up and create a process upset, instrument or equipment failure, or fire. The pressure is relieved by allowing the pressurized fluid to flow via the relief valve 214 to an auxiliary passage out of the system.

As noted above, the modified gathering manifold 228 also includes a three-phase separator 202 coupled to the sampling header 230 downstream of the diverters for the one or more wells. The three-phase separator 202 is configured to separate the production fluid received from the sampling header 230 into crude oil, water, and gas, and to detect a volume flow rate for each of the crude oil, the water, and the gas. In some example embodiments, the three-phase separator 202 includes one or more sensors configured to detect the volume flow rates for the crude oil, the water, and the gas. The separation and exact measurements of the production fluid from the well is performed without requiring the other wells to be shut-in during the flow rate test. In addition, the results may be automatically uploaded and analyzed in the system instantaneously.

The modified gathering manifold 228 also includes a return header 232 coupled to the three-phase separator 202 and the production header 210. The return header 232 is configured to pass the combined crude oil, the water, and the gas from the three-phase separator 202 into the production header 210.

In some example embodiments, the three-phase separator 202 receives the production fluid under pressurized conditions. Due to different densities under pressurized conditions in the three-phase separator 202, the oil, water, and gas in the production fluid separate into individual components. After separation, the gas flows out of the three-phase separator 202 through a gas line where the gas is metered, the oil flows out through an oil line where the oil is metered, and the water flows out through a water line where the water is metered. After the components' volume flow rates are measured, the separated oil, gas, and water are recombined in the return header 232 and are transported to a processing facility 234.

As the modified gathering manifold 228 receives the first production flow through the first production line 206 and directs the first fluid using the first diverter 220 to the three-phase separator 202, the modified gathering manifold 228 simultaneously receives a second production flow through the second production line 208. The modified gathering manifold 228 directs the second production flow into the production header 210 using a production valve 224 associated with the second production line 208. A relief valve 226 associated with the second production line 208 is coupled to the relief header 216 and may open in proportion to an increase in the pressure of the second production fluid flowing through the second production line 208.

Thus, while the modified gathering manifold 228 separates the first fluid into a crude oil, a water, and a gas using the three-phase separator 202, and detects a volume flow rate for each of the crude oil, the water, and the gas in the three-phase separator 202, the modified gathering manifold 228 contemporaneously permits the production fluids from one or more other production pipelines, such as the second production line 208, to flow into the production header 210. Upon detecting the volume flow rate for each of the crude oil, the water, and the gas of the first fluid diverted to the three-phrase separator 202, the modified gathering manifold 228 directs the crude oil, the water, and the gas into the production header 210 via the return header 232. In the production header 210, the modified gathering manifold 228 combines the crude oil, the water, and the gas received from the three-phase separator 202 with the one or more production fluid flows received from the one or more other production pipelines (e.g., the second production flow from the second production line 208) into a combined fluid flow.

In some example embodiments, the diverting of the production flow from a well is done manually by re-orienting the alignment of the diverter (e.g., a valve) to cause the production fluid flow to pass through the three-phase separator 202. In other example embodiments, the diverting is performed automatically by utilizing one or more automated flow stations, with the aid of a digitally computerized system (DCS). In this case, motor-operated diverters are opened and closed automatically.

Continuing with FIG. 2, the system 200 also includes a trunk line 218 coupled to the modified gathering manifold 228 downstream of the production header 210. The trunk line 218 receives and transports the combined fluid flow to the processing facility 234.

In various example embodiments, the system 200 further includes a computer device (e.g., a personal computer, a smart phone, etc.). The detected volume flow rate for each of the crude oil, the water, and the gas may be displayed on a computer screen of the computer device.

In certain example embodiments, a future production of the first well is modified based upon the detected volume flow rate for each of the crude oil, the water, and the gas. For example, based on the results of the determined gas, oil and water, the production of the well is evaluated after several testing periods by either increasing the production if the decline rate is low, or decreasing the production from the well if the decline rate is high.

Those skilled in the art will appreciate that the system of FIG. 2 eliminates the need to rent separator equipment or manpower from service companies, as the three-phrase separator 202 is permanently installed in the modified gathering manifold 228 configuration. The associated operating costs for conducting a deliverability test are thereby reduced. Once the three-phase separator 202 is connected in the modified gathering manifold 228, an operator may remotely divert the well that needs to be tested to the three-phrase separator 202, which will allow the fluid from that corresponding well to flow through the three-phrase separator 202 and the exact rates of the fluid components may be measured. Each well can be diverted on-demand, enabling deliverability tests to be conducted on each well once per month, for example, which allows for better monitoring of the performance and health of the reservoirs. The decline in flow rate and pressure may be monitored easily and inputted automatically using any software. The pressure and rate drop per month may be automatically calculated, therefore enabling the production increase of strong wells or the reduction of production from low-performing wells.

Figure 3:
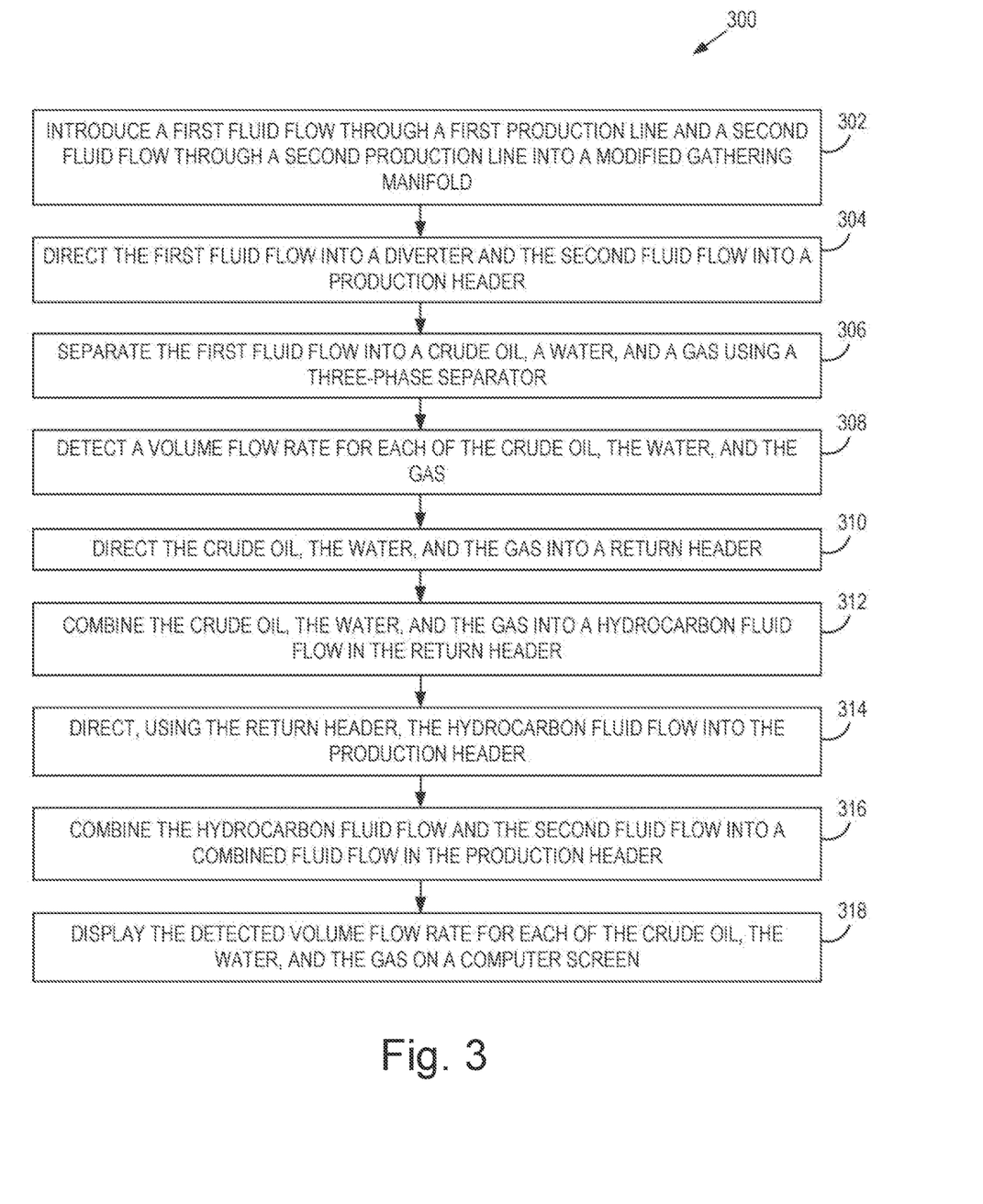
FIG. 3 is a process flow diagram for a method of using the modified gathering manifold for measuring production fluid components, according to one or more example embodiments.

FIG. 3 is a process flow diagram for a method 300 of using the modified gathering manifold 228 for measuring production fluid components, according to one or more example embodiments. Steps of the method 300 may be performed using the components described above with respect to FIG. 2. One or more blocks in FIG. 3 may be performed by a computing system such as that shown and described below in FIGS. 4A and 4B. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Step 302, a first production flow of a first production line 206 and a second production flow of a second production line 208 are introduced into the modified gathering manifold 228. The first production line 206 is coupled to a first well and the second production line 208 is coupled to a second well. The production flow of each production line of a corresponding well may be hydrocarbon flow made up of oil, water, and gas, among other materials.

At step 304, the modified gathering manifold 228 is configured such that the first production flow is directed into the first diverter 220 and the second production flow is directed into the production header 210. Such a configuration may be achieved by use of diverters included in the modified gathering manifold 228, such as check valves, that are either opened to allow fluid to be diverted to the three-phrase separator 202 while bypassing the production header 210, or closed to allow the fluid to flow directly to the production header 210. The production header 210 is, in some example embodiments, included in the modified gathering manifold 228.

For example, a first production fluid flowing through a first production line 206 of the plurality of production lines 204 is diverted to the sampling header 230 by activating (i.e., to an open position) the first diverter 220 coupled to the first production line 206, while simultaneously (or concurrently) closing a production valve 212 coupled to the first production line 206 and a relief valve 214 coupled to the first production line 206, and while simultaneously (or concurrently) closing the second diverter 222 coupled to a second production line 208 through which a second production fluid flows directly to the production header 210. Those skilled in the art will appreciate that any combination of opening/closing diverters as shown in FIG. 2 would result in diverting fluid flows from different production lines of wells to either the production header or the 3-phase separator, depending on which fluid flows need to be tested.

At Step 306, the first production flow is separated into a crude oil, a water, and a gas using the three-phase separator 202. More specifically, in Step 306, the permanent three-phase separator 202 of the modified gathering manifold 228 separates the hydrocarbon flow into crude oil, water, and gas.

At Step 308, a volume flow rate for each of the crude oil, the water, and the gas is detected in the three-phase separator 202. In various example embodiments, the three-phase separator 202 includes one or more sensors. The one or more sensors are configured to detect the volume flow rate for each of the crude oil, the water, and the gas as each of the separated fluids flow through the three-phase separator 202. In other words, the three-phrase separator 202 performs the deliverability tests on the production flow from an individual well of a plurality of wells.

At Step 310, the crude oil, the water, and the gas are directed into a return header 232. The return header 232 is coupled to the three-phase separator 202 and the production header 210.

At Step 312, the crude oil, the water, and the gas are combined back into a combined hydrocarbon fluid flow in the return header 232.

At Step 314, the hydrocarbon fluid flow is directed, using the return header 232, into the production header 210.

At Step 316, the hydrocarbon fluid flow and the second production flow are combined into a combined fluid flow in the production header 210. The second production fluid flows through the second production line 208 of the plurality of production lines 204 into the production header 210 via the production valve 224 coupled to the second production line 208. This combined fluid flow then goes to a processing facility 234, such as a refinery, via the trunk line 218.

In some example embodiments, at Step 318, the detected volume flow rate for each of the crude oil, the water, and the gas is displayed on a computer screen.

In various example embodiments, a future production of the first well is modified based upon the detected volume flow rate for each of the crude oil, the water, and the gas.

Figure 4A:
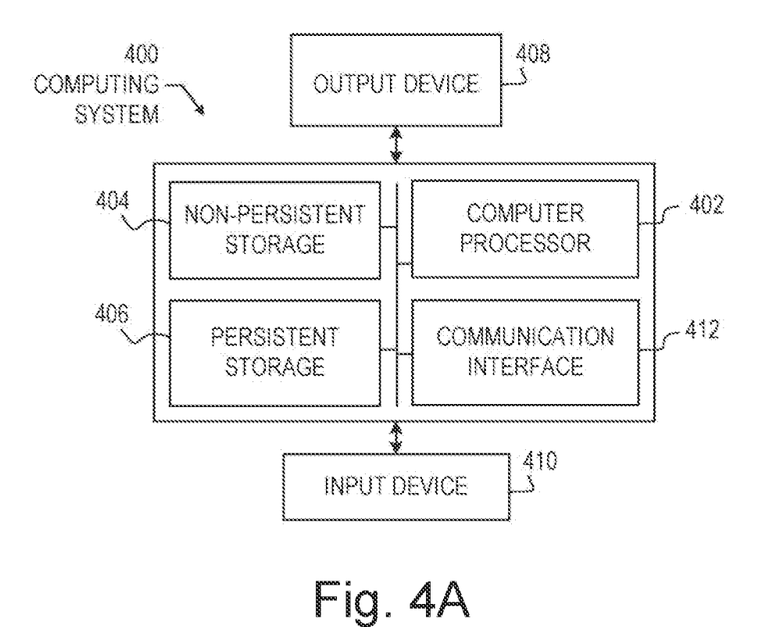
FIGS. 4A and 4B illustrate a computing system, according to one or more example embodiments.

Example embodiments may be implemented on a computing system. Any combination of mobile, desktop, server, router, switch, embedded device, or other types of hardware may be used. For example, as shown in FIG. 4A, the computing system 400 may include one or more computer processors 402, non-persistent storage 404 (e.g., volatile memory, such as random access memory (RAM) or cache memory), persistent storage 406 (e.g., a hard disk, an optical drive such as a compact disk (CD) drive or digital versatile disk (DVD) drive, or a flash memory), a communication interface 412 (e.g., Bluetooth interface, infrared interface, network interface, or optical interface), and numerous other elements and functionalities.

The computer processor(s) 402 may be an integrated circuit for processing instructions. For example, the computer processor(s) 402 may be one or more cores or microcores of a processor. The computing system 400 may also include one or more input devices 410, such as a touchscreen, keyboard, mouse, microphone, touchpad, or electronic pen.

The communication interface 412 may include an integrated circuit for connecting the computing system 400 to a network (not shown) (e.g., a local area network (LAN), a wide area network (WAN), such as the Internet, mobile network, or any other type of network) or to another device, such as another computing device.

Further, the computing system 400 may include one or more output devices 408, such as a screen (e.g., a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) 402, non-persistent storage 404, and persistent storage 406. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 4B:
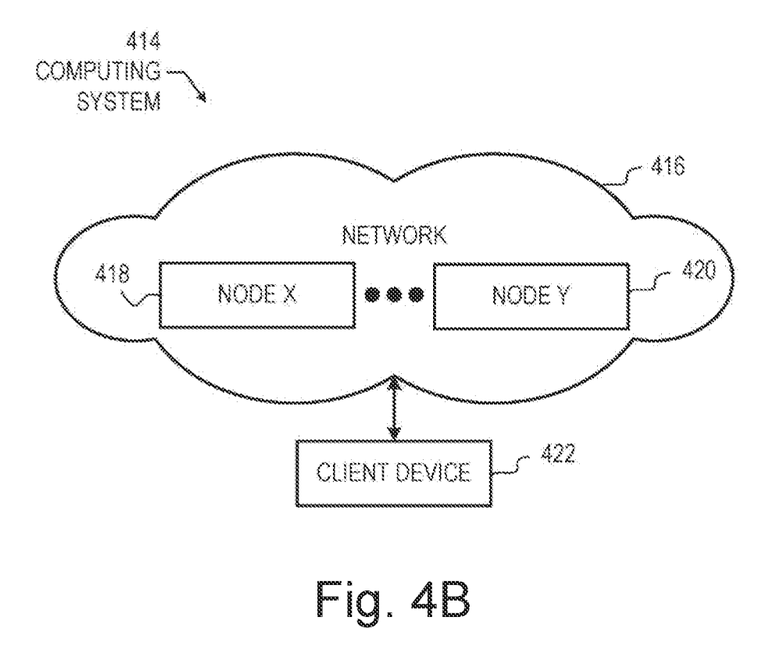

The computing system 400 in FIG. 4A may be connected to or be a part of a network. For example, as shown in FIG. 4B, the network 416 may include multiple nodes (e.g., node X 418 or node Y 420). Each node may correspond to a computing system, such as the computing system shown in FIG. 4B, or a group of nodes combined may correspond to the computing system shown in FIG. 4B. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 414 may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (e.g., node X 418 or node Y 420) in the network 416 may be configured to provide services for a client device 422. For example, the nodes may be part of a cloud computing system. The nodes may include functionality to receive requests from the client device 422 and transmit responses to the client device 422. The client device 422 may be a computing system, such as the computing system shown in FIG. 4B. Further, the client device 422 may include or perform all or a portion of one or more embodiments of the disclosure.

The previous description of functions presents only a few examples of functions performed by the computing system of FIG. 4A and the nodes or client device in FIG. 4B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A modified gathering manifold comprising:
    a sampling header coupled to each of a plurality of production lines of a plurality of wells;
    a plurality of diverters, each coupled to one of the plurality of production lines of the plurality of wells associated with the modified gathering manifold, upstream of a relief header coupled to each of the plurality of production lines and a production header associated with the modified gathering manifold and coupled to each of the plurality of production lines, each diverter being configured to be activated to an open position and deactivated into a closed position;
    the sampling header being configured to receive a production fluid diverted by at least one diverter of the plurality of diverters when the at least one diverter is in the open position;
    a three-phase separator coupled to the sampling header downstream of the plurality of diverters, the three-phase separator being configured to:
        separate the production fluid into crude oil, water, and gas, and
        detect a volume flow rate for each of the crude oil, the water, and the gas; and
    a return header coupled to the three-phase separator and the production header, the return header being configured to pass the crude oil, the water, and the gas from the three-phase separator into the production header where the crude oil, the water, and the gas are combined into a hydrocarbon fluid flow.

2. The modified gathering manifold of claim 1, wherein the at least one diverter of the plurality of diverters is a sampling coupling.

3. The modified gathering manifold of claim 1, wherein the at least one diverter of the plurality of diverters is a check valve.

4. The modified gathering manifold of claim 1, wherein the three-phase separator includes one or more sensors configured to detect the volume flow rate for each of the crude oil, the water, and the gas.

5. The modified gathering manifold of claim 1, wherein a first production fluid flowing through a first production line of the plurality of production lines is diverted to the sampling header by activating to an open position a first diverter of the plurality of diverters coupled to the first production line,
    while simultaneously closing a production valve coupled to the first production line and a relief valve coupled to the first production line, and
    while simultaneously closing a second diverter of the plurality of diverters coupled to a second production line through which a second production fluid flows directly to the production header.

6. The modified gathering manifold of claim 1, further comprising:
    the production header,
    wherein the production fluid is a first production fluid that flows through a first production line of the plurality of production lines;
    wherein the hydrocarbon fluid flow is combined, in the production header, with a second production fluid that flows through a second production line of the plurality of production lines into the production header via a production valve coupled to the second production line.

\* \* \* \* \*